United States Patent [19]

Malmbak-Kjeldsen

[11] Patent Number: 4,811,692
[45] Date of Patent: Mar. 14, 1989

[54] METHOD OF EMPTYING A BARGE OF FISH AND A BARGE FOR USE IN THE PERFORMANCE OF THE METHOD

[75] Inventor: Kurt Malmbak-Kjeldsen, Jyderup, Denmark

[73] Assignee: Musholm Lax A/S, Denmark

[21] Appl. No.: 10,192

[22] PCT Filed: Apr. 11, 1986

[86] PCT No.: PCT/DK86/00037

§ 371 Date: Dec. 10, 1986

§ 102(e) Date: Dec. 10, 1986

[87] PCT Pub. No.: WO86/05946

PCT Pub. Date: Oct. 23, 1986

[30] Foreign Application Priority Data

Apr. 12, 1985 [DK] Denmark .................. 1650/85

[51] Int. Cl.⁴ .................................. A01K 61/00
[52] U.S. Cl. ................................ 119/3; 114/255
[58] Field of Search ............. 119/2, 3, 4; 114/26, 114/27, 73, 255; 414/140

[56] References Cited

U.S. PATENT DOCUMENTS

| | | | |
|---|---|---|---|
| 3,356,057 | 12/1967 | Lunde | 114/27 |
| 3,716,026 | 2/1973 | Gross | 119/3 |
| 4,011,826 | 3/1977 | Yee | 114/26 |
| 4,197,805 | 4/1980 | Puretic | |

FOREIGN PATENT DOCUMENTS

| | | | |
|---|---|---|---|
| 1199539 | 8/1965 | Fed. Rep. of Germany | 119/3 |
| 0721045 | 3/1980 | U.S.S.R. | 119/3 |
| 0799695 | 1/1981 | U.S.S.R. | 119/3 |

Primary Examiner—Gene Mancene
Assistant Examiner—Michael Lynch
Attorney, Agent, or Firm—Darby & Darby

[57] ABSTRACT

To transfer fry from tanks in a barge to breeding cages immersed wholly or partly in water, use is made of a scraper consisting of a frame in which a wire net is stretched. The frame is journalled as to be pivotable about a preferably fixed axis from a vertical to a substantially horizontal position lifting fish to the level of the upper edge of the barge hull, where a hopper mounted to a hose is placed. The other end of the hose is passed down into a cage. Fish are flushed through the hose down into the cage by a water stream introduced to the hopper. Both the net frame and the hopper may be moved from one tank to another. The tank-defining part of the barge hull is preferably quater-circular in cross-section.

13 Claims, 1 Drawing Sheet

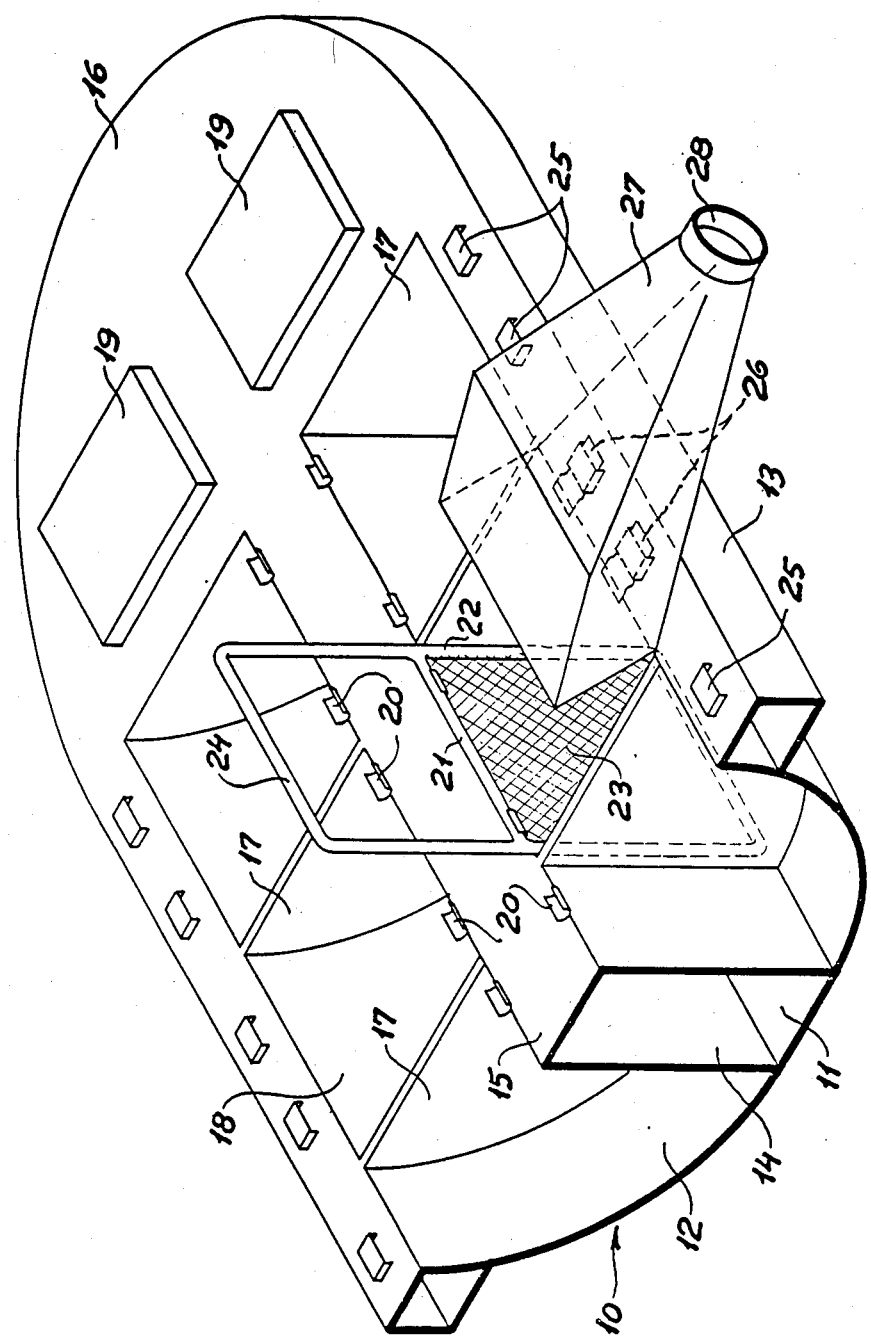

METHOD OF EMPTYING A BARGE OF FISH AND A BARGE FOR USE IN THE PERFORMANCE OF THE METHOD

The object of the invention is to provide a method of the present type which enables rapid and easy emptying of a tank of fish.

This object is achieved by moving a net-shaped scraper means having a width corresponding to the distance between two adjacent partitions so that its outer edge substantially follows the inner side of the hull with constant change in the angle formed by the scraper means with the vertical plane. Thus, by performance of a single movement through the entire tank the scraper means pushes all the fish ahead of it so that during the last part of the movement all the fish are brought up to the upper edge of the hull from where they can be poured directly down into a cage or down into a net or a bucket from where they can then be poured down into the cage.

A more rapid and rational way of transfer is stated in claim 2. Thus, the fish are flushed through the hose A more rapid and rational way for transferring of the fish is disclosed by the present application. According to the invention, the fish can be flushed through the hose directly down into the cage.

The present invention provides a particular simple design of the barge, so that the movement of scraper means is simple rotation about a fixed axis.

The present invention provides a structure which is in addition to making the barge stable, provides convenient way of temporary attachment of a hopper with a hose for transferring of the fish to a cage. A pump with a flushing hose for the same purpose is provided. Both the flushing hose and the hopper can readily be moved from one tank to another.

The present invention also provides an arrangement which enables scraper means to be moved from one tank to another, so that common scraper means may be used for all the tanks.

A simple construction of the attachment means for the hopper is also disclosed by the present invention.

A simple embodiment of the attachment means for the hopper is stated in claim 8.

One end of an embodiment of the barge of the invention is shown cut transversely in the drawing and will be described more fully below with reference to the drawing.

In the drawing, the barge hull is generally designed by 10. This hull has a relatively narrow, plane centre bottom part 11 and two hull parts 12, which are quarter-circular in cross-section and along whose upper edge a hollow floating member, substantially rectangular in cross-section, extends. The plane bottom part 11 forms one side of a box-shaped central part 14 whose upper side is coplanar with the upper edge of the hull and forms a footbridge 15 between two decks 16 above the rounded ends of the hull.

The spaces between the central part 14 and the hull are divided into a plurality of tanks 18 of the same size by transverse partitions 17. The front and the rear partitions 17 close the spaces between the decks 16 and the hull. These end spaces are accessible through hatches 19 in the decks and are used for storing various equipment, such as e.g. oxygen cylinders for oxidation of the water in the tanks.

Two upwardly open bearings 20 of semi-circular cross-section are attached to the upper edge of the central part 14, in alignment with each tank 18. Each pair of these bearings accommodates the upper frame member 21 of a rectangular frame 22, which may e.g. consist of stainless steel tubes, and in which a wire net 23 is stretched. This frame with wire net forms a scraper means which has approximately the same width as the tanks and extends, in the position shown in the drawing, right down to the bottom of the hull, with the exception of a small clearance. The side frame members are extended upwardly and interconnected by a transverse member forming a handle 24.

Two brackets 25 of rectangular cross-section are attached to the upper side of the floating member 13, in alignment with each tank 18. The brackets serve to receive flat, rearwardly extending fingers 26 of a Z-shaped cross-section, which are attached to the underside of a hopper 27 with a rectangular mouth facing obliquely downwardly toward the tank and with a pipe connection 28 for mounting a hose (not shown).

When fry is to be transferred from a water-filled tank 18 to a breeding cage (not shown), the hopper 27 is placed in alignment with the tank in question, and the free end of the hose is introduced into the cage. The frame 22 with the wire net 23 is placed in the bearings 20 in alignment with the same tank and pivoted by means of the handle 24 from the position shown in the drawing up to an approximately horizontal position. During this pivoting movement, the lower, horizontal frame member is moved along the inner side of the hull, and all the fish are moved up in front of the mouth of the hopper 27. The free end of a flushing hose which is connected to the pressure side of a pump in the barge, is now placed in the hopper mouth so that the pump ejects a strong water jet into the hopper and the transport hose connected with it. This stream of water carries the fish down into the cage. When the tank is thus emptied of fish, the hopper and the net frame may be moved to another tank, and the transport hose may optionally be moved to another cage, and then the process may be repeated and so on until all the fish in the barge have been transferred to cages.

The shown and described barge may be modified in many ways within the scope of the invention. For example, the barge hull does not have to have a circular-arc-shaped cross-section because instead of being pivotable about a fixed axis, the net frame may have bearing pins which are slidable in slits in bearing means so that the lower, horizontal frame member can still be caused to follow the inner side of the hull during its pivotal movement. The frame may also be journalled in other ways. Further, each tank may optionally have its own firmly mounted net frame.

I claim:

1. A method of emptying a barge of fish, said barge having a hull with transverse partitions which divide said barge into tanks, comprising moving a net-shaped scraper means having a width corresponding to a distance between an adjacent two of the partitions so that an outer edge of the scraper means substantially follos an inner side of the hull with constant change in the angle formed by the scraper means with a vertical plane, the moving including pivoting the scraper means at a top of one of the tanks so that the outer edge of the scraper means is movable up to an upper edge of the hull.

2. A method of emptying a barge of fish, said barge having a hull with transverse partitions which divide said barge into tanks, comprising moving a net-shaped scraper means having a width corresponding to a distance between and adjacent two of the partitions so that an outer edge of the scraper means substantially follows an inner side of the hull with constant change in the angle formed by the scraper means with a vertical plane, transferring fish from one of the tanks to a fish breeding cage immersed wholly or partly in the water, by placing a hopper, connected with a hose, at the upper edge of the hull between the two partitions, and conveying a stream of water from a pump into the hopper.

3. A barge for use in emptying fish, comprising a hull with transverse partitions which divide the barge into tanks, at least one net-shaped scraper means having substantially the same width as one of said tanks and so arranged in said one tank to have an outer edge movable along an inner side of said hull with simultaneous change in the angle formed by the scraper means with the vertical plane, and means for pivotally connecting said scraper means to a top of said one tank so that said outer edge of said scraper means is movable to an upper edge of said hull.

4. A barge according to claim 3, wherein each tank is defined by two transverse partitions and the hull as well as by a longitudinal, substantially vertical wall, that the tank-defining part of the hull is substantially circular-arc shaped in cross-section, and that the scraper means is so arranged or adapted to be so arranged as to be pivotable about the axis of the tank hull part.

5. A barge according to claim 4, wherein the scraper means consists of a rectangular frame in which a wire net is stretched, that upwardly open bearing means to receive the upper, horizontal frame member are placed at the top of each of the substantially vertical tank walls, and that the frame has an upwardly extending, preferably loop-shaped handle.

6. A barge according to claim 5, wherein the attachment means on the floating member are formed by brackets to receive rearwardly extending fingers on the underside of the hopper.

7. A barge according to claim 4, wherein a floating member extends around the upper edge of the hull, and that means are provided on the upper side of the floating member in alignment with each tank for the attachment of a hopper with a reactangular mouth mounted on a hose.

8. A barge according to claim 7, wherein the scraper means consists of a rectangular frame in which a wire net is stretched, that upwardly open bearing means to receive the upper, horizontal frame member are placed at the top of each of the substantially vertical tank walls, and that the frame has an upwardly extending, preferably loop-shaped handle.

9. A barge according to claim 3, further comprising a floating member extends around the upper edge of the hull, and that means are provided on the upper side of the floating member in alignment with each tank for the attachment of a hopper with a reactangular mouth mounted on a hose.

10. A barge according to claim 9, further comprising a pump is placed in the barge, the pressure side of said pump being connected with one end of a hose, whose other end may be placed in alignment with each hopper position.

11. A barge according to claim 10, wherein the attachment means on the floating member are formed by brackets to receive rearwardly extending fingers on the underside of the hopper.

12. A barge according to claim 9, wherein the attachment means on the floating member are formed by brackets to receive rearwardly extending fingers on the underside of the hopper.

13. A barge according to claim 9, wherein the scraper means consists of a rectangular frame in which a wire net is stretched, that upwardly open bearing means to receive the upper, horizontal frame member are placed at the top of each of the substantially vertical tank walls, and that the frame has an upwardly extending, preferably loop-shaped handle.

* * * * *